United States Patent [19]

Depret et al.

[11] Patent Number: 5,285,415
[45] Date of Patent: Feb. 8, 1994

[54] DATA COUNTING MEMORY CARD AND READER

[75] Inventors: Eric Depret, Caen; Laurent Sourgen, Aix en Provence, both of France

[73] Assignees: France Telecom, Paris; SGS-Thomson Microelectronics, S.A., Gentilly, both of France

[21] Appl. No.: 902,209

[22] Filed: Jun. 22, 1992

[30] Foreign Application Priority Data

Jun. 20, 1991 [FR] France .................. 91 08126

[51] Int. Cl.$^5$ .................. G06K 5/00; G06F 15/30
[52] U.S. Cl. .................. 365/189.01; 235/380; 235/379; 235/382; 235/385; 235/492
[58] Field of Search .............. 235/380, 379, 382, 385, 235/492; 365/189.01

[56] References Cited

U.S. PATENT DOCUMENTS

| | | |
|---|---|---|
| 4,256,955 | 3/1981 | Giraud et al. |
| 4,367,402 | 1/1983 | Giraud et al. |
| 4,853,526 | 8/1989 | Effing |
| 5,033,021 | 7/1991 | Barakat .................. 235/379 |
| 5,089,959 | 2/1992 | Hazard .................. 235/350 |

FOREIGN PATENT DOCUMENTS 2600795 6/1986 France.
0378454 11/1989 France.

OTHER PUBLICATIONS

European Search Report.

*Primary Examiner*—Eugene R. LaRoche
*Assistant Examiner*—Viet Q. Nguyen
*Attorney, Agent, or Firm*—Lowe, Price, LeBlanc & Becker

[57] ABSTRACT

An integrated circuit for a passive unit counting memory card comprises p levels (10, 11, 12) of data counting memory. The levels contain corresponding numbers of cases $n_1 \ldots n_p$, a write operation being achieved in a case of an upper rank level each time all the cases of the lower rank level have been enabled, the cases of the lower levels then being erased. The circuit comprises p-1 ghost levels (21, 22) identical to the p-1 upper rank levels of the p counting levels. The addressing logic of the ghost levels is such that the cases of ghost levels are addressed in write phase simultaneously with the cases of the corresponding counting levels and, after a write phase, are addressed in erase phase simultaneously with the cases of the levels of lower rank than the one that has just been enabled.

4 Claims, 3 Drawing Sheets

DATA COUNTING MEMORY CARD AND READER

BACKGROUND OF THE INVENTION

The present invention relates to "passive" integrated circuits included in a portable support. Here, a "passive" integrated circuit designates a circuit with no internal microprocessor but comprising only a memory and decoding means for, in response to a limited number of control signals, sequentially accessing successive cases of the memory and achieving in the memory read, write or erase operations.

Hereinafter, for the sake of simplicity, memory cards only will be referred to because they are the most broadly used support, but it is clear that any other portable support can be used. Thus, below, "memory card" designates the assembly of an integrated circuit, its connecting terminals and any portable support that can be associated to a reader.

A common application of memory cards is prepaid telephone cards. In such cards, memory cases are initially set to a predetermined state, and this state is modified in response to external pulses corresponding, for example, to telephone units or to pay units for any service provided by a reader into which the card is inserted.

The invention more particularly relates to cards in which the data counting memory is an electrically erasable memory, for example an EEPROM-type memory, that is, an Electrically Erasable Programmable Read Only Memory.

FIG. 1 very schematically shows the main components of a semiconductor memory usable in a memory card of this type. Conventionally, this card is associated to a reader with which the card communicates through six connecting pads: two power supply pads $V_{SS}$ and $V_{CC}$, an output pad OUT and three programmation pads A, ST and B. Programmation pads provide signals to an array of logic circuits or programmable logic array 1 to control a column decoder 2 (Y DEC) and a line decoder 3 (X DEC) both associated to an EEPROM 4. Logic circuits 1 also enable, as a function of control signals, to set the memory in read state (R), write state (W) or erase state (E). In read state, the addressed memory case is read, that is, its state is provided to the OUT pad. In write state, the state of the addressed memory case is set to 1. In erase state, a set of simultaneously addressed cases is reset. More particularly, control pads A, ST and B are generally provided to receive either one of three control orders: a reset order which establishes a positioning on the address of the first memory bit, a read order which enables incrementing the memory address and outputting the value of the addressed case, and a programmation order which enables reversing the state of the addressed case or cases to achieve a write or erase operation. According to a characteristic of this type of memory, it is not possible to simultaneously address in read, write or erase mode distinct locations of the memory.

One of the advantages of an EEPROM is that the memory can be arranged in an abacus-type system. This means that the memory is arranged in several levels each comprising a determined number of cases. Each time a lower rank level is full, a case of immediately upper rank level is enabled and the cases of the lower rank level are erased. Thus, for example, with three 8-case levels, at least $8 \times 8 \times 8$ data can be counted instead of $8+8+8$ data only if the memory is not erasable.

The state of the art and the invention will be described hereafter in the case of three levels each comprising eight cases, but it will be clear to those skilled in the art that a larger number of levels can be used and that the levels will not necessarily have the same number of cases. Generally, it is possible to provide p levels each comprising $n_i (i=1 \ldots p)$ cases; thus, it will be possible to store in the memory $n_1 \times n_2 \times \ldots \times n_p$ data. By way of example, one will only consider a logic configuration wherein lower rank levels are sequentially erased after writing is achieved in an upper rank register.

The basic arrangement of an abacus-type memory is illustrated in FIG. 2 which shows three 8-case levels 10, 11 and 12 addressable through a column decoder (Y DEC) and a rank decoder (X DEC).

FIGS. 3A, 3B and 3C show a first exemplary filling of levels or registers arranged as an abacus-counter. In FIG. 3A, the lower rank level 10 is full, and levels 11 and 12 are empty. At the step illustrated in FIG. 3B, once level 10 is filled, decoders X and Y set the addressing to the lower case of level 11 and a "1" is written in this level. At the step of FIG. 3C, the whole content of level 10 is erased. Then writing is resumed at the lower rank case of level 10 (not shown).

Of course, these successive addressing operations are ensured by the reader associated to the card which comprises logic circuits adapted to achieve these operations. In particular, the reader first starts, when a card is inserted therein, reading the content of all memories to determine the card state and setting the addressing to achieve. Thus, the reader "knows" in which filling state the various levels are, and can ensure the proper addressing control. However, as indicated above, it is only possible to achieve at a determined period a read, write or erase operation, that is why the transition from the state shown in FIG. 3A to the state shown in FIG. 3C has to be achieved by passing through the intermediate state shown in FIG. 3B.

FIGS. 4A–4E illustrate other exemplary successive states of the memory levels. In FIG. 4A, levels 10 and 11 are full and three cases of level 12 have been filled. At the step shown in FIG. 4B, an additional bit is written in level 12. At the step shown in FIG. 4C, the content of level 11 is erased. At the step illustrated in FIG. 4D, an additional bit is written in level 11. During the step shown in FIG. 4E, the content of level 10 is erased. The writing of a 1 at the step of FIG. 4D enables a storing operation by multiples of 8 instead of 9; moreover, the logic circuits of the reader "know" that, as soon as a datum is written in register 12, at least one 1 must exist in register 11. This can be used to detect a possible error.

The above description corresponds to the state of the art in order to exemplify the field of application of the invention.

The above described arrangement has a drawback; namely, if for any reason, card processing is abruptly interrupted during the state illustrated in FIGS. 3B, 4B or 4D, that is, when the levels with a lower rank than the one in which a datum has just been written have not yet been erased, the card will remain in this state when it is inserted again into the reader. Hence, the memory will have been charged with a number of units higher than the service that has been effectively provided (8 excessive units in the case of FIGS. 3B or 4D, $8 \times 8 = 64$ units in the case illustrated in FIG. 4B). This drawback is particularly liable to occur in modern card readers in which the card is not swallowed by the reader but remains apparent, that is, the user can abruptly take out his card at an intermediate state corresponding to FIGS. 3B or 4B-4D. The user will then be unduly charged.

SUMMARY OF THE INVENTION

An object of the invention is to avoid this drawback and to ensure, when the card is subsequently used, the erasing of the lower rank levels which would not have been erased at the end of a previous operation.

To achieve this object, the invention provides an integrated circuit for a "passive" counting unit on a portable support. The counting unit comprises p data counting memory levels for counting data including a corresponding amount of cases $n_1 \ldots n_p$, a write operation being achieved in a case of an upper rank level each time all the cases of the lower rank level have been enabled, the cases of the lower levels being then erased. The circuit further comprises (p-1) ghost levels identical to p-1 upper rank levels of the p counting levels, the addressing logic of the ghost levels being such that the cases of these ghost levels are simultaneously addressed in write phase with the cases of the corresponding counting levels and, after a writing, are addressed in erase phase simultaneously with the cases of the levels lower than the one that has just been enabled.

According to an embodiment of the invention, a read decoder associated with each memory level enables, during write phases, simultaneously addressing the corresponding ghost level and during erase phases of the upper rank ghost level.

A reader associated with a portable support according to the invention comprises initial reading means for all the cases of the ghost levels and means sensitive to a write operation in a case of a ghost level to simultaneously erase this case of the ghost level and the cases of the data counting level having a lower rank.

BRIEF DESCRIPTION OF THE DRAWINGS

The foregoing and other objects, features and advantages of the invention will be apparent from the following detailed description of a preferred embodiment as illustrated in the accompanying figures wherein:

FIGS. 1, 2, 3A-3C, 4A-4E, above described, are intended to explain the field of application of the invention;

FIGS. 5A-5E are intended to illustrate in the case of a preferred example the process implemented by the device according to the invention.

DETAILED DESCRIPTION OF THE INVENTION

FIGS. 5A-5E show three data counting levels as part of the same example as the one above described in relation with FIGS. 4A-4E.

Figure 1:
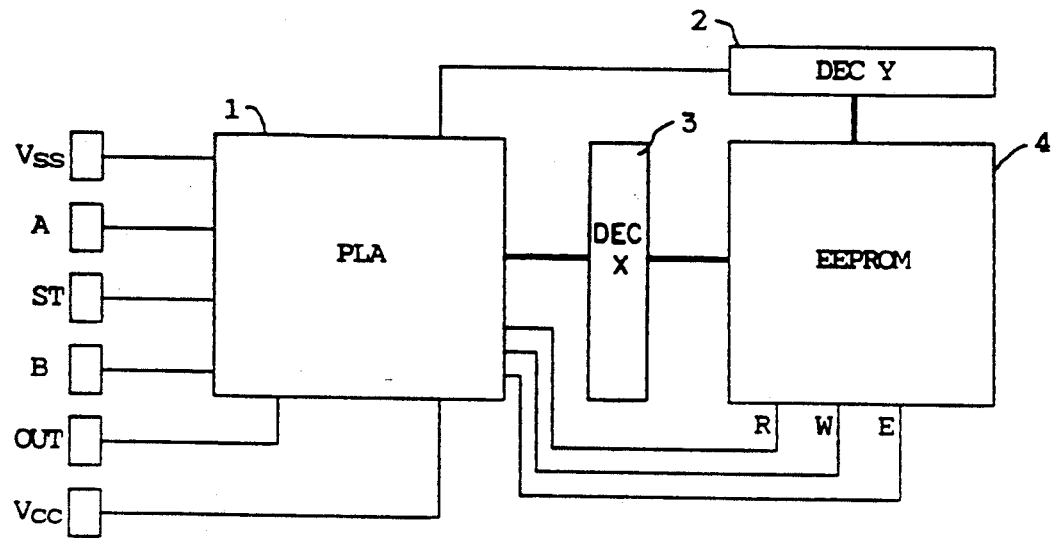

According to the invention, in addition to data counting levels 10, 11, 13 above described, ghost levels corresponding to the upper levels of the counting levels are provided in EEPROM 4 of FIG. 1. Thus, in the specific example above described, where three 8-bit counting levels 10, 11 and 12 are provided, two 8-bit ghost levels 21 and 22 are provided. More generally, if there are p counting levels comprising $n_1 \ldots n_p$ cases, respectively, there will be p-1 ghost levels comprising $n_2 \ldots n_p$ cases, respectively.

During writing of a 1 in one of levels 11 and 12, a 1 will be simultaneously written in the corresponding case of the corresponding ghost level 21 or 22 and, during each erase phase of a lower rank level following writing of a 1 in the upper rank counting level, the 1 written in the ghost level will be simultaneously erased.

Figures 4A, 4B, 4C, 4D, 4E, 5A, 5B, 5C, 5D, 5E:
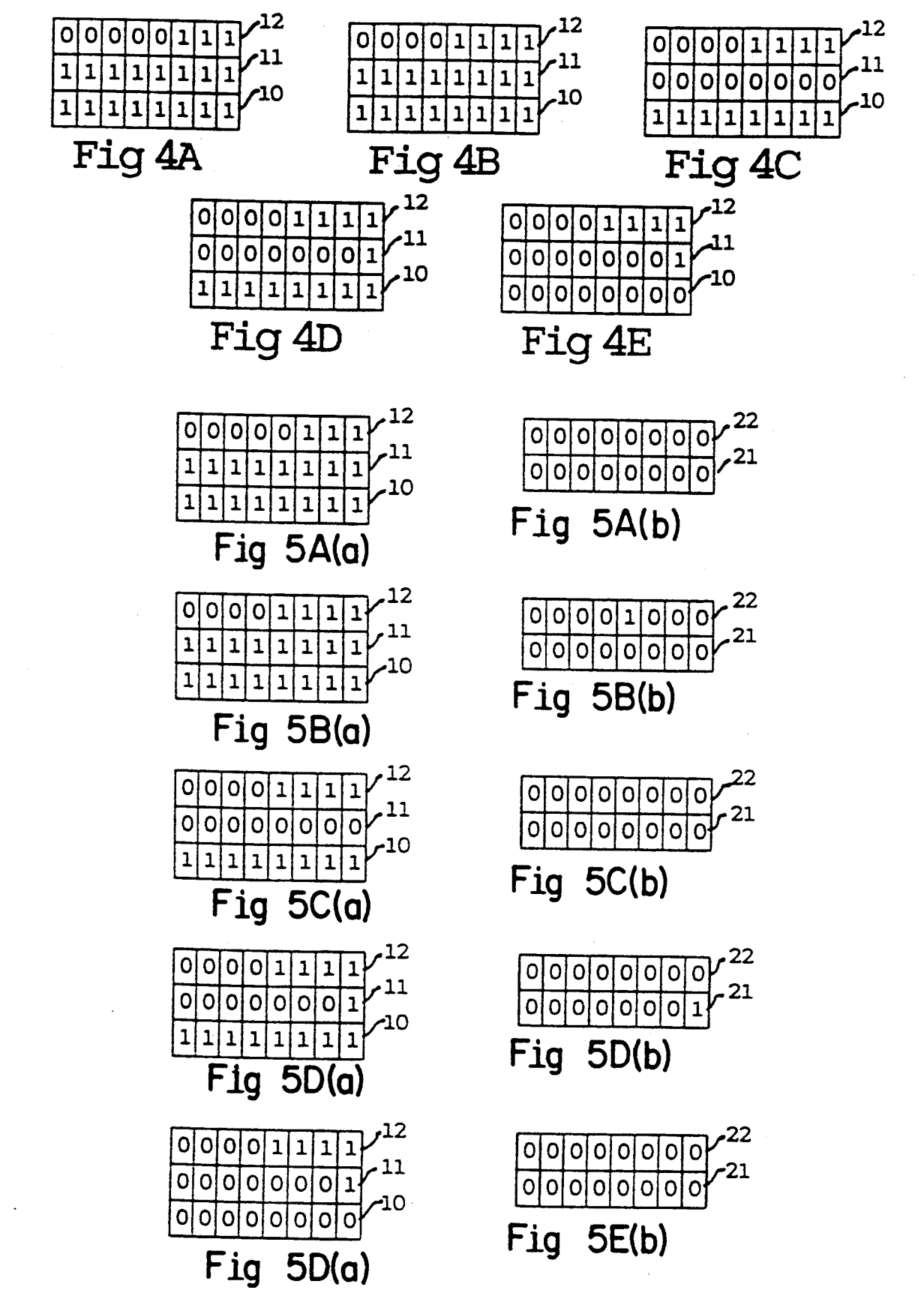

In FIGS. 5A-5E, the successive states of levels 10, 11 and 12 are similar to the successive states of these levels in FIGS. 4A-4E. In the state of FIG. 5A, all bits of the ghost levels 21 and 22 are set to zero. In the state of FIG. 5B, when a 1 is written in the fourth case of level 12, a 1 is simultaneously written in the fourth case of level 22. In the state of FIG. 5C, when level 11 is erased, level 22 is simultaneously erased. In the state of FIG. 5E, when a 1 is written in the last case of level 11, a 1 is simultaneously written in the last case of level 21. In the state of FIG. 5E, while level 10 is erased, level 21 is simultaneously erased, so that the ghost levels are emptied again.

Thus, if the operations achieved in the memory card by the reader are abruptly interrupted during the intermediate steps occurring between FIGS. 5B and 5C or 5D and 5E, when the card is subsequently introduced into a reader, the reader will detect the 1 written in the ghost level 22 or 21 and will be able to initiate the operations necessary for obtaining the state shown in FIG. 5E before achieving any new data counting operation in the card. It will be noted that the described method does not allow detecting an accidental interruption between the states of FIGS. 5C and 5D, the reference registers being then empty, but such an error state can be detected by the existing circuits, as above indicated.

Given the desired operation of the circuit according to the invention above described, those skilled in the art will be able to achieve the decoding operations adapted to fulfill adequate functions. Hereafter, will be indicated by way of example only, a preferred circuit embodiment for simultaneously writing a 1 in the upper rank level and in the corresponding reference register, then for simultaneously erasing the reference registers and counting registers having a lower rank than the one in which a datum has just be written.

Figure 2:
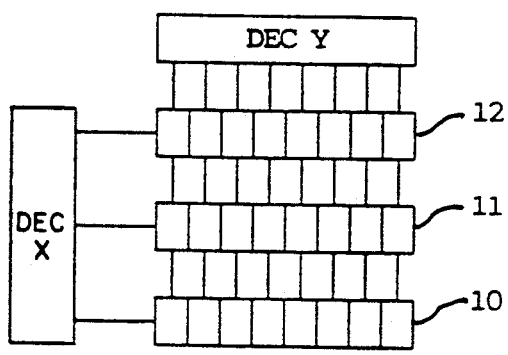
Figure 3A:
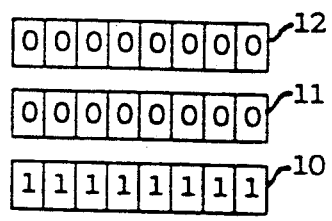
Figure 3B:
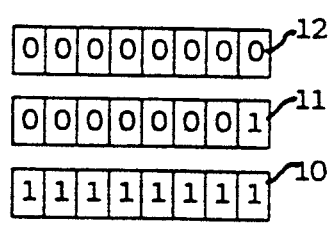
Figure 3C:
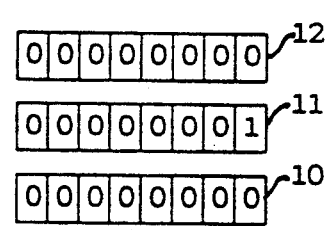
Figure 6:
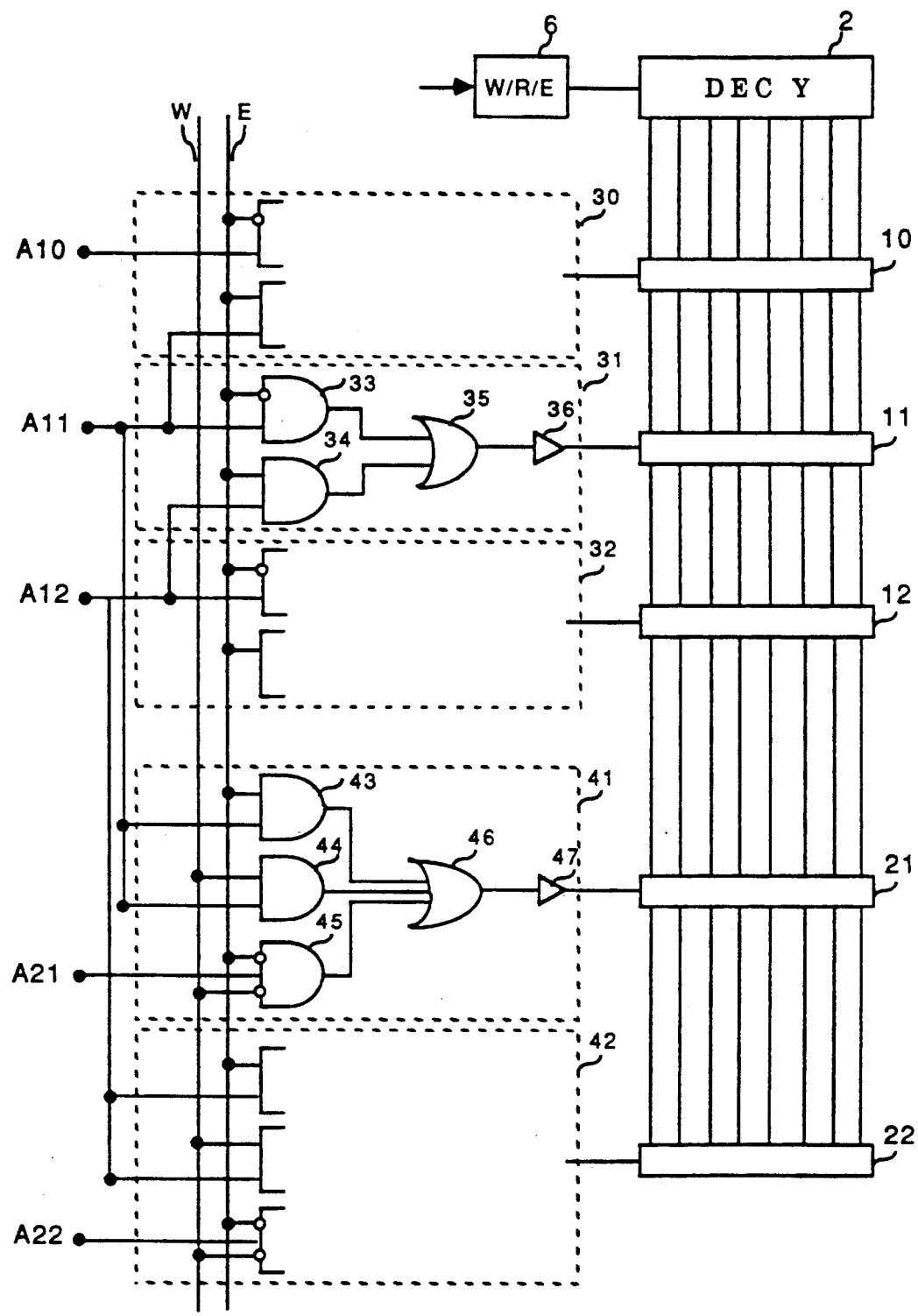
FIG. 6 shows in more detail a preferred embodiment of the invention.

FIG. 6 very schematically shows decoding circuits associated with counting levels 10, 11 and 12 and with two corresponding ghost levels 21 and 22. In this figure, Y decoder 2 (DEC Y) is still very schematically represented as being associated with a circuit 6 for determining the write, read or erase (W, R, E) mode. Circuits 2 and 6 are controlled by conventional logic circuits 1 shown in the form of blocks in FIG. 1. Levels 10, 11 and 12 can be X-addressed by address lines A10, A11 and A12 provided by the row decoder DEC×3 shown in the form of blocks in FIGS. 1 and 2. Address lines A21, A22 are also provided for designating rows corresponding to levels 21 and 22.

Between each address line A10, A11 and A12 and each level 10, 11 and 12 is inserted a logic block 30, 31 and 32, respectively, and between each address line A21, A22 and each level 21 and 22 is inserted a logic block, 41 and 42, respectively. Only logic blocks 31 and 41 will be described, logic blocks 30, 31 and 32 being identical, as well as logic blocks 41 and 42.

Logic block 31 comprises two-input AND gates 33 and 34, an OR gate 35 and a buffer 36 liable, as a function of the W/R/E / order from block 6, to achieve a write, read or erase operation in row 11. In addition, write control lines W and erase control lines E, corresponding to the states in block 6, are provided. AND gate 33 has a first reversing input connected to line E. The second input of AND gate 33 is connected to address line A11 (this line A11 is also connected to the second input of the AND gate 34 of lower rank block 30). The first input of AND gate 34 is connected to line E. The second input of AND gate 34 is connected to address line A12 of the upper rank level. The outputs of AND gates 33 and 34 are applied, through OR gate 35 and buffer 36, to row 11.

Logic block 41 comprises three AND gates 43, 44 and 45, the outputs of which are applied through an OR gate 46 and an amplifying circuit 47 to row 21. The first input of AND gate 43 is connected to line E. The second input of AND gate 43 is connected to address input A11. The first input of AND gate 44 is connected to write line W and its second input is connected to address line A11. The first input of AND gate 45 is connected to address line A21 and the second and third inputs of AND gate 45 are reversing inputs connected to write line W and erase line E, respectively.

These logic circuits operate as follows. Ghost levels 21 and 22 can be selectively addressed to determine their content by providing address signals to address lines A21 and A22, respectively, and of course by properly incrementing the column decoder 2. This specific addressing of levels 21 and 22 is possible only when the write or erase phases are not achieved because of the two reverse inputs connected to the write and erase lines of the AND gate 45.

However, during the write phase and when row 11 has been designated by address A11, on the one hand, row 11 is designated by address A11 by AND gate 33 and, on the other hand, row 21 is addressed by AND gate 44 which is enabled by address A11 and write line W. Thus, a 1 is simultaneously written at a same Y location in rows 11 and 21.

Then, a state corresponding to the one of FIG. 5B is obtained. If an interruption occurs, this state will be detected when the card is inserted again in the reader during the reading of level 21 because of the operation of address line A21.

If no interruption has occurred, address A11 remains selected, write line W is set low, and erase line E is set high, while all columns are selected to be erased by Y decoder 2 and logic circuit 6. Then, AND gate 33 of level 31 is inhibited by the occurrence of the erase signal whereas AND gate 34 of level 30 is enabled by address signal A11 and erase signal E. Thus, all columns in row 10 are simultaneously erased. At the same time, the high level signal on lines A11 and E enables AND gate 43 of logic circuit 41, and all the cases of row 21 are also selected to be erased.

As is apparent to those skilled in the art, various modifications can be made to the above disclosed embodiments of the invention, in particular as regards the number of cases of the various levels and the number of levels. On the other hand, in the above described embodiments, validations have been indicated by states 1 or states 0. It is clear to those skilled in the art that it is possible to achieve a coherent system in which high states and low states are inverted. In addition, only the portions of the memory card and of the reader useful for understanding the invention have been described. It is obvious that the card comprises other conventional characteristics. For example, the memory will contain non-erasable identification areas, various protection circuits, for example to avoid overwriting, these protection circuits can be modified to implement the invention.

We claim:

1. A passive unit counting integrated circuit for a portable support comprising:

p memory levels for counting data containing corresponding numbers of memory cases $n_1 \ldots n_p$, a write operation being carried out for a case of an upper rank level when all cases of lower rank level have been enabled, said lower level cases being then disabled, (p-1) ghost levels identical to the p-1 upper rank levels of the p memory levels for counting, the addressing logic of the ghost levels being such that the cases of said ghost levels are addressed in a write phase simultaneously with the respective cases of the corresponding counting levels and, after a write phase, are addressed in an erase phase simultaneously with the cases of the memory levels of lower rank than the rank that has just been enabled.

2. A circuit according to claim 1, comprising a read decoder associated with each memory level for simultaneously addressing, during write phases, the corresponding ghost level of a same rank.

3. A circuit according to claim 1, comprising a read decoder associated with each memory level for simultaneously addressing, during erase phases, the upper rank ghost level.

4. A reader associated with a portable support including an integrated circuit according to claim 1, comprising:

means for initially reading all the memory cases of the ghost levels, and means responsive to a write operation in a case of a ghost level to simultaneously erase said case of the ghost level and the cases of the lower rank level of the memory levels for counting.

* * * * *